(12) United States Patent
Mori et al.

(10) Patent No.: US 7,690,480 B2
(45) Date of Patent: Apr. 6, 2010

(54) SOUNDPROOF MATERIAL

(75) Inventors: Masahiko Mori, Kariya (JP); Akimasa Tanaka, Komaki (JP)

(73) Assignee: Toyota Boshoku Kabushiki Kaisha (JP)

( * ) Notice: Subject to any disclaimer, the term of this patent is extended or adjusted under 35 U.S.C. 154(b) by 260 days.

(21) Appl. No.: 11/562,075

(22) Filed: Nov. 21, 2006

(65) Prior Publication Data

US 2007/0119651 A1 May 31, 2007

(30) Foreign Application Priority Data

Nov. 30, 2005 (JP) ............................... 2005-347053

(51) Int. Cl.
*E04B 1/82* (2006.01)

(52) U.S. Cl. .................. 181/290; 181/284; 181/286

(58) Field of Classification Search ................ 181/290, 181/204, 284, 286; 296/39.3, 211
See application file for complete search history.

(56) References Cited

U.S. PATENT DOCUMENTS

| | | | | |
|---|---|---|---|---|
| 2,326,763 | A * | 8/1943 | Crandell | 428/138 |
| 3,424,270 | A * | 1/1969 | Hartman et. al. | 181/290 |
| 3,658,635 | A * | 4/1972 | Eustice | 428/425.8 |
| 4,097,633 | A * | 6/1978 | Focht | 428/138 |
| 4,190,131 | A * | 2/1980 | Robinson | 181/296 |
| 4,237,178 | A * | 12/1980 | Mazaki | 442/228 |
| 4,488,619 | A * | 12/1984 | O'Neill | 181/290 |
| 5,088,576 | A * | 2/1992 | Potthoff et al. | 181/290 |
| 5,094,318 | A * | 3/1992 | Maeda et al. | 181/290 |
| 5,186,996 | A * | 2/1993 | Alts | 428/72 |
| 5,258,585 | A * | 11/1993 | Juriga | 181/286 |
| 5,493,081 | A * | 2/1996 | Manigold | 181/286 |
| 5,709,925 | A * | 1/1998 | Spengler et al. | 428/198 |
| 5,923,002 | A * | 7/1999 | McGrath et al. | 181/290 |
| 6,123,171 | A * | 9/2000 | McNett et al. | 181/290 |
| 6,145,617 | A * | 11/2000 | Alts | 181/290 |
| 6,569,509 | B1 * | 5/2003 | Alts | 428/73 |
| 7,055,649 | B2 * | 6/2006 | Tompson et al. | 181/290 |
| 7,201,253 | B2 * | 4/2007 | Duval et al. | 181/204 |
| 7,318,498 | B2 * | 1/2008 | Woodman et al. | 181/290 |
| 7,320,739 | B2 * | 1/2008 | Thompson et al. | 156/308.2 |

(Continued)

FOREIGN PATENT DOCUMENTS

EP 1612768 A1 1/2006

(Continued)

OTHER PUBLICATIONS

Extended European Search Report for EP 06 02 4222 dated Apr. 2, 2007.

*Primary Examiner*—Jeffrey Donels
*Assistant Examiner*—Forrest M Phillips
(74) *Attorney, Agent, or Firm*—Caesar, Rivise, Bernstein, Cohen & Pokotilow, Ltd.

(57) ABSTRACT

A soundproof material is provided with a first sound absorbing layer arranged on a vehicle panel, a second sound absorbing layer closer to an inner side of a passenger compartment, and an intermediate layer provided between the sound absorbing layers. The intermediate layer is constituted by two layers having a high-density layer and a low-density layer. The air permeability of the intermediate layer is set lower than the first sound absorbing layer and the second sound absorbing layer. The intermediate layer is arranged in such a manner that the high-density layer is adjacent to the second sound absorbing layer.

7 Claims, 7 Drawing Sheets

U.S. PATENT DOCUMENTS

| | | | |
|---|---|---|---|
| 7,410,030 B2* | 8/2008 | Fusiki et al. | 181/286 |
| 2002/0117352 A1* | 8/2002 | Veen et al. | 181/292 |
| 2002/0187300 A1* | 12/2002 | Nakasuji et al. | 428/95 |
| 2004/0231915 A1* | 11/2004 | Thompson et al. | 181/290 |
| 2005/0016793 A1* | 1/2005 | O'Regan et al. | 181/290 |
| 2005/0103564 A1* | 5/2005 | Duval et al. | 181/204 |
| 2005/0126848 A1* | 6/2005 | Siavoshai et al. | 181/207 |
| 2005/0217932 A1* | 10/2005 | Woodman et al. | 181/290 |
| 2006/0021823 A1* | 2/2006 | Kohara et al. | 181/290 |
| 2006/0113146 A1* | 6/2006 | Khan et al. | 181/286 |
| 2006/0137936 A1* | 6/2006 | Schulze et al. | 181/290 |
| 2006/0201741 A1 | 9/2006 | Inoue et al. | |
| 2006/0289231 A1* | 12/2006 | Priebe et al. | 181/290 |
| 2007/0012512 A1* | 1/2007 | Fusiki et al. | 181/286 |
| 2007/0119651 A1* | 5/2007 | Mori et al. | 181/290 |
| 2008/0073146 A1* | 3/2008 | Thompson et al. | 181/291 |
| 2008/0173497 A1* | 7/2008 | Kalinova et al. | 181/290 |
| 2008/0185220 A1* | 8/2008 | Grabenstetter | 181/290 |

FOREIGN PATENT DOCUMENTS

| | | |
|---|---|---|
| JP | 3359645 | 12/2002 |
| JP | 2003-019930 | 1/2003 |
| WO | 98/18657 | 5/1998 |
| WO | 2004/086354 A1 | 10/2004 |

* cited by examiner

Fig.11 ately, the hard layer 23 has a comparatively great air
SOUNDPROOF MATERIAL

BACKGROUND OF THE INVENTION

The present invention relates to a soundproof material, for example, installed on a floor surface within a passenger compartment, in order to improve quietness.

Figure 10:
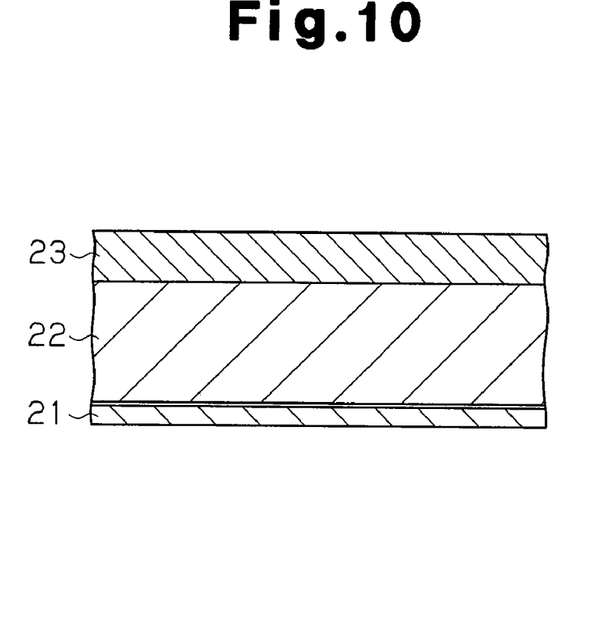
FIG. 10 is a partial cross-sectional view showing a prior art soundproof material.

For example, as shown in FIG. 10, a soundproof material disclosed in Japanese Patent No. 3359645 is provided with a soft layer 22 arranged on a vehicle panel 21 serving as a floor surface within the passenger compartment, and a hard layer 23 arranged on the soft layer 22. In accordance with this publication, the soft layer 22 has an air permeability, and an air permeability of the hard layer 23 is set lower than that of the soft layer 22. The mass per area of the hard layer 23 is set within a range between 300 and 2000 g/m$^2$, inclusive. The weight of the hard layer 23 is set greater than the soft layer 22 in order to attenuate a vibration due to sound.

Figure 11:
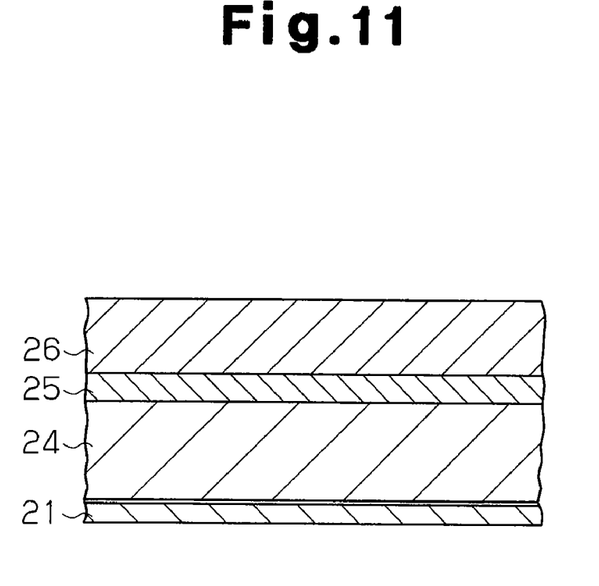
FIG. 11 is a partial cross-sectional view showing another prior art soundproof material.

Further, as shown in FIG. 11, a soundproof material disclosed in Japanese Laid-Open Patent Publication No. 2003-19930 is provided with a first sound absorbing layer 24 arranged on a vehicle panel 21, an intermediate layer 25 arranged on the first sound absorbing layer 24, and a second sound absorbing layer 26 arranged on the intermediate layer 25. In accordance with this publication, the mass per area of the first sound absorbing layer 24 is set to 900 g/m$^2$, and the mass per area of the second sound absorbing layer 26 is set to 500 g/m$^2$. Further, the mass per area of the intermediate layer 25 is set within a range between 10 and 200 g/m$^2$, inclusive, and the air permeability thereof is set within a range between 3 and 35 cc/cm$^2$/sec, inclusive.

However, in the case of the soundproof material disclosed in Japanese Patent No. 3359645, in the hard layer 23, it is necessary to make the density high and increase the weight while maintaining the air permeability. Accordingly, it is necessary to use a binder fiber for the hard layer 23, or it is necessary to apply a hot press work. Accordingly, since the weight of the soundproof material itself is increased as well as a manufacturing cost becomes higher, this structure is not suitable for an in-vehicle part. Further, both of the soft layer 22 and the hard layer 23 have the air permeability, and particularly, the hard layer 23 has a comparatively great air permeability (5 cc/cm$^2$/sec or more). Accordingly, since the noise easily transmits through the soundproof material, this structure is not preferable in view of a sound insulating property. In order to cope with this, a resin panel having no air permeability may be used as the hard layer 23. In this case, a manufacturing cost becomes lower, and a sound transmission is suppressed. However, not only the noise within the passenger compartment is reflected by the hard layer 23, but also the noise from an outside of the vehicle is transmitted to an inside of the vehicle via the hard layer 23. Therefore, there is a risk that the quietness within the passenger compartment is deteriorated.

Further, in the soundproof material disclosed in Japanese Laid-Open Patent Publication No. 2003-19930, all of the intermediate layer 25, the first sound absorbing layer 24, and the second sound absorbing layer 26 are formed by the soundproof material. In this case, in order to sufficiently obtain the quietness within the passenger compartment, it is unavoidable that the entirety of the soundproof material becomes thick. Accordingly, it becomes hard to secure an installation space of the soundproof material within the passenger compartment. Further, since the weight of the soundproof material itself is increased, the structure is not preferable for an in-vehicle part. Further, since the soundproof material is constituted by a felt or an unwoven fabric having an excellent sound absorbing performance, there is a defect that a noise attenuation effect cannot be sufficiently obtained, and the noise transmission loss characteristic is low. Because of the above, there is a problem in respect of the matter that the quietness is secured by the soundproof material.

SUMMARY OF THE INVENTION

An objective of the present invention is to provide a soundproof material that requires no specific material or machining, is capable of lowering the manufacturing costs, obtaining a high sound insulating property by increasing a sound transmission loss characteristic, reducing the thickness and the weight, and is preferable for an in-vehicle part.

In accordance with one aspect of the present invention, a soundproof material including a first sound absorbing layer and a second sound absorbing layer, which have an air permeability, and an intermediate layer provided between the first and second sound absorbing layers is provided. The intermediate layer has a two-layer structure of a high-density layer and a low-density layer. An air permeability of the intermediate layer is lower than the air permeability of the first and second sound absorbing layers.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A soundproof material for an automobile according to one embodiment of the present invention will be described with reference to the accompanying drawings.

Figure 1:
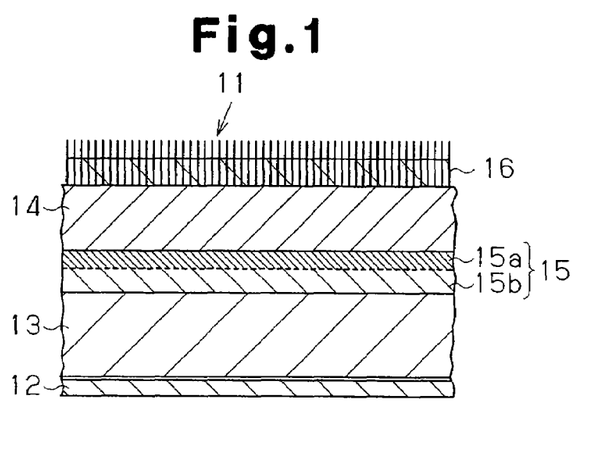
FIG. 1 is a partial cross-sectional view showing a soundproof material in accordance with one embodiment.

As shown in FIG. 1, a soundproof material 11 is provided with a first sound absorbing layer 13 arranged on a vehicle panel 12, a second sound absorbing layer 14 arranged on the first sound absorbing layer 13, an intermediate layer 15 arranged between the first and second sound absorbing layers 13 and 14, and an ornamental layer 16 arranged on the second sound absorbing layer 14. The ornamental layer 16 serves as a carpet. The respective layers 13 to 16 are adhered to each other via an adhesive agent.

The density of the first sound absorbing layer 13 is lower than that of the second sound absorbing layer 14. The first sound absorbing layer 13 is constituted by a porous material, and is specifically constituted by a felt material formed by a regenerated fiber, a general-purpose fiber or the like including wool, polyethylene (PE), polyethylene terephthalate (PET) or the like as a main component. In the first sound absorbing layer 13, the mass per area is set within a range between 300 and 1800 $g/m^2$, inclusive, the air permeability is set within a range between 5 and 100 $cc/cm^2/sec$, inclusive, and the thickness is set within a range between 10 and 60 mm, inclusive.

Further, the second sound absorbing layer 14 is constituted by a porous material, and is specifically constituted by the felt material such as PET or the like. In the second sound absorbing layer 14, the mass per area is set within a range between 500 and 1000 $g/m^2$, inclusive, the air permeability is set within a range between 5 and 100 $cc/cm^2/sec$, inclusive, and the thickness is set within a range between 4 and 15 mm, inclusive.

The intermediate layer 15 is formed by an unwoven fabric constituted by a synthetic resin such as PE, PET or the like. The intermediate layer 15 is constituted by two layers comprising a high-density layer 15a and a low-density layer 15b. In the intermediate layer 15, the mass per area is set within a range between 100 and 500 $g/m^2$, inclusive, and the thickness is set within a range between 0.1 and 4 mm, inclusive. The intermediate layer 15 is formed by bringing a heated roller into contact with one surface of a sheet material having a low density, and fusing a part of the sheet material so as to make the density high and make the rigidity high. Accordingly, the high-rigidity high-density layer 15a and the low-density layer 15b are integrally formed. The intermediate layer 15 is arranged in such a manner that the high-density layer 15a is adjacent to the second sound absorbing layer 14, and the low-density layer 15b is adjacent to the first sound absorbing layer 13. The air permeability of the intermediate layer 15 is set lower than the first sound absorbing layer 13 and the second sound absorbing layer 14, and is specifically set within a range between 2 and 5 $cc/cm^2/sec$, inclusive (preferably less than 5 $cc/cm^2/sec$).

The ornamental layer 16 is constituted by a needle punch carpet having a mass per area of 350 $g/m^2$. The air permeability of the ornamental layer 16 is set equal to or more than 30 $cc/cm^2/sec$. As mentioned above, in the soundproof material 11 in accordance with this embodiment, the air permeability of the first sound absorbing layer 13 and the second sound absorbing layer 14 is set higher than that of a conventional soundproof material, and is specifically set equal to or more than 5 $cc/cm^2/sec$. Accordingly, a sound absorbing function is achieved, and it is possible to absorb the noise within the passenger compartment and the noise from the outside of the vehicle.

Further, in the soundproof material 11 in accordance with the embodiment, the intermediate layer 15 having the low air permeability is arranged between the first and second sound absorbing layers 13 and 14 having the air permeability. Accordingly, it is possible to increase the transmission loss characteristic with respect to the noise passing through the soundproof material 11 from the outside of the vehicle or from the inside of the passenger compartment. Further, the air permeability of the intermediate layer 15 is at least 2 $cc/cm^2/sec$. Therefore, it is possible to prevent a transmission resonance generated in the case that the air permeability is extremely low, and it is possible to prevent the noise from the outside of the vehicle from being transmitted to the inside of the passenger compartment via the vibration of the intermediate layer 15. In other words, since the noise transmission from the outside of the vehicle to the inside of the passenger compartment is suppressed, a high sound insulating property can be achieved, and quietness within the passenger compartment is improved. Particularly, in this embodiment, as is apparent from the following example, the transmission loss with respect to the noise in a low frequency region (near 500 Hz) which the human feels uncomfortable.

Figure 2:
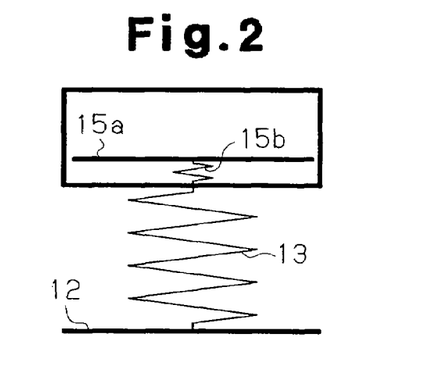
FIG. 2 is an explanatory view for describing an operation of the soundproof material.

Further, in the soundproof material 11 in accordance with the embodiment, the density of the first sound absorbing layer 13 arranged on the vehicle panel 12 is lower than that of the second sound absorbing layer 14 arranged closer to the passenger compartment, and the intermediate layer 15 is arranged between the first and second sound absorbing layers 13 and 14. Accordingly, as shown in FIG. 2, since the first sound absorbing layer 13 serves as a spring, and the second sound absorbing layer 14 and the intermediate layer 15 serve as a mass, it is possible to effectively attenuate the noise. Further, it is possible to change a frequency region of the noise which can be attenuated, in correspondence to the thicknesses of both the sound absorbing layers 13 and 14, whereby it is possible to further effectively attenuate the uncomfortable noise.

Further, the intermediate layer 15 is constituted by two layers comprising the high-density layer 15a and the low-density layer 15b. The high-density layer 15a is arranged adjacent to the high-density second sound absorbing layer 14, and the low-density layer 15b is arranged adjacent to the low-density first sound absorbing layer 13. Accordingly, as is apparent from FIG. 2, since the low-density layer 15b of the intermediate layer 15 serves as the spring, and the high-density layer 15a serves as a mass, it is possible to further effectively attenuate the noise. As mentioned above, since the small spring and mass are included in the large spring and mass, it is possible to attenuate noises in different frequency regions. Further, it is thus possible to attenuate the noise in a wide frequency range.

As mentioned above, in accordance with the soundproof material 11 of the present embodiment, since the small spring and mass are included in the large spring and mass, it is not necessary to make the density higher or increase the weight while maintaining the air permeability of the intermediate layer 15. Accordingly, it is possible to easily manufacture the soundproof material 11, and it is possible to lower the manufacturing costs. Further, since the soundproof material 11 neither becomes too heavy nor becomes too thick, it is possible to achieve a weight saving and a space saving, and the structure is preferable for a in-vehicle part.

Further, the high-density layer 15a of the intermediate layer 15 is heat treated by the heated roller. Accordingly, the upper surface of the high-density layer 15a is densified and smoothened, but the lower surface of the low-density layer 15b is not heat treated but is raised. Further, since the upper surface of the high-density layer 15a is adhered to the second sound absorbing layer 14 having the higher density than that of the first sound absorbing layer 13, it is possible to absorb the resonance or the transmission resonance caused by the high-density layer 15a by the second sound absorbing layer 14. Further, since the lower surface of the low-density layer 15b is arranged on the first sound absorbing layer 13 having the lower density than that of the second sound absorbing layer 14, it is possible to make the noise from the outside of the passenger compartment irregularly reflect by the low-density layer 15b. Accordingly, the noise transmission loss is further improved.

As mentioned above, in the soundproof material 11, it is not necessary to apply both of two conflicting properties, that is, the air permeability and the density to the intermediate layer 15. Accordingly, since the specific material or machining is not necessary at a time of manufacturing the soundproof material 11, it is possible to achieve a reduction of the manufacturing costs, and it is possible to achieve the thin structure and the weight saving. Further, in this soundproof material 11, the noise transmission loss characteristic and the sound insulating property are increased. Accordingly, the quietness within the passenger compartment is improved, and the structure is preferable for the in-vehicle part.

EXAMPLE

A description will be given below of an example in accordance with the embodiment while comparing with a prior art example and a comparative example.

As an example 1 in accordance with the soundproof material 11 of the embodiment shown in FIG. 1, there was prepared a soundproof material in which the mass per area of the first sound absorbing layer 13 was 600 g/m$^2$, the air permeability thereof was 50 cc/cm$^2$/sec, and the thickness thereof was 15 mm, the mass per area of the second sound absorbing layer 14 was 700 g/m$^2$, the air permeability thereof was 30 cc/cm$^2$/sec and the thickness thereof was 6 mm, and the mass per area of the intermediate layer 15 was 250 g/m$^2$, the air permeability thereof was 4 cc/cm$^2$/sec and the thickness thereof was 2 mm.

As a prior art example 1 in accordance with the prior art soundproof material shown in FIG. 10, there was prepared a soundproof material in which the mass per area of the soft layer 22 was 720 g/m$^2$, the air permeability thereof was 30 cc/cm$^2$/sec and the thickness thereof was 18 mm, and the mass per area of the hard layer 23 was 800 g/m$^2$, the air permeability thereof was 10 cc/cm$^2$/sec, and the thickness thereof was 3 mm. Further, as a prior art example 2 in accordance with the prior art soundproof material shown in FIG. 11, there was prepared a soundproof material in which the mass per area of the first sound absorbing layer 24 was 600 g/m$^2$, the air permeability thereof was 30 cc/cm$^2$/sec and the thickness thereof was 15 mm, the mass per area of the second sound absorbing layer 26 was 700 g/m$^2$, the air permeability thereof was 35 cc/cm$^2$/sec and the thickness thereof was 6 mm, and the mass per area of the intermediate layer 25 is 250 g/m$^2$, the air permeability thereof was 20 cc/cm$^2$/sec, and the thickness thereof was 2 mm.

Figure 3A:
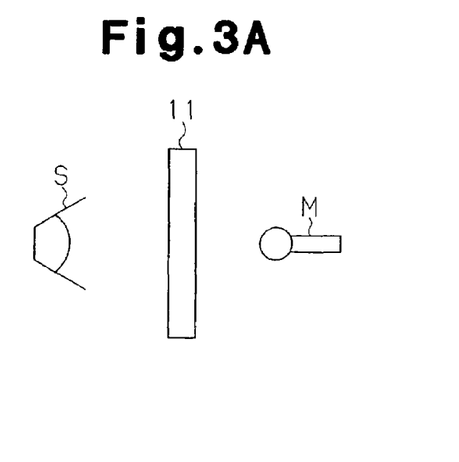
FIG. 3A is a schematic view showing a measuring method of a transmission loss.
Figure 6:
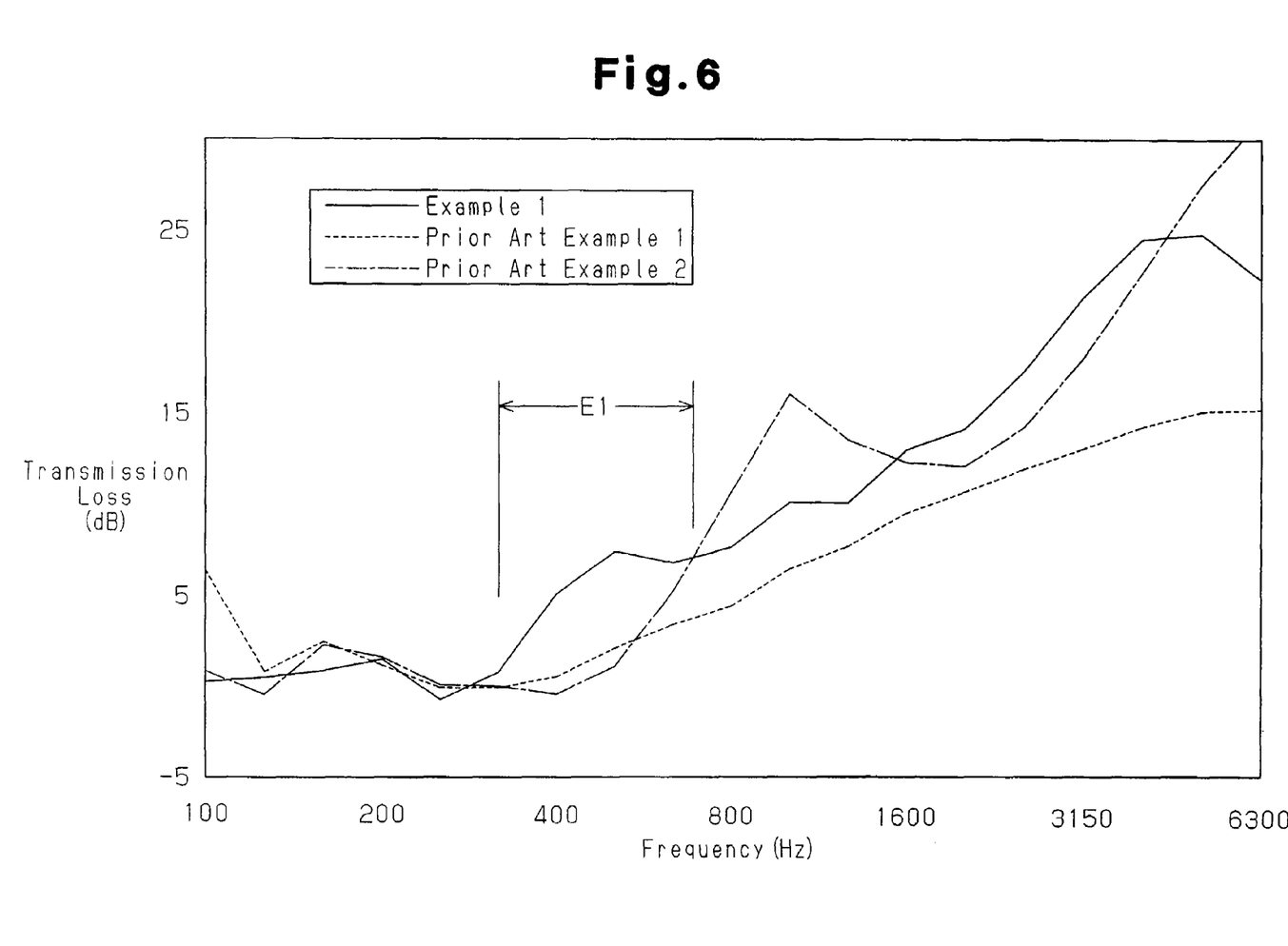
FIG. 6 is a graph showing a result of measurement of the transmission loss of soundproof materials in accordance with an example and a comparative example.

FIG. 6 shows results of measurement of the transmission loss with respect to the soundproof materials in accordance with the example 1, the prior art example 1 and the prior art example 2. In order to measure the transmission loss, as shown in FIG. 3A, a speaker S was installed toward the first sound absorbing layer 13 of the soundproof material 11, and a microphone M was installed toward the second sound absorbing layer 14. Further, sounds of various frequencies were outputted from the speaker S, and picked up by the microphone M after passing through the soundproof materials, and the transmission loss of each soundproof material was measured. The value of the transmission loss was determined on the basis of the measured results. On the basis of the results, it was confirmed that in the case of the soundproof material of the example 1, the transmission loss was greater than the soundproof materials of the prior art example 1 and the prior art example 2 in the low frequency region near 350 to 700 Hz, inclusive (a range E1 shown in FIG. 6). Particularly, near 400 Hz, the difference of the transmission loss equal to or more than 5 decibel (db) existed between the example 1, and the prior art examples 1 and 2. In order to increase the transmission loss at 5 db, it is necessary to make an entire weight of the soundproof material about twice. On the basis of the results mentioned above, in the case of the soundproof material of the example 1, it was confirmed that felt sound volume and sound pressure were widely lowered.

Figure 3B:
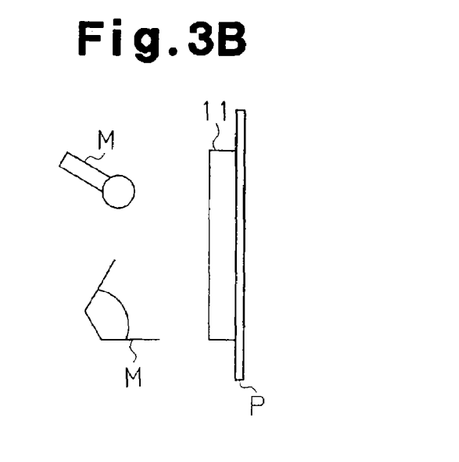
FIG. 3B is a schematic view showing a measuring method of a sound absorbing coefficient.
Figure 7:
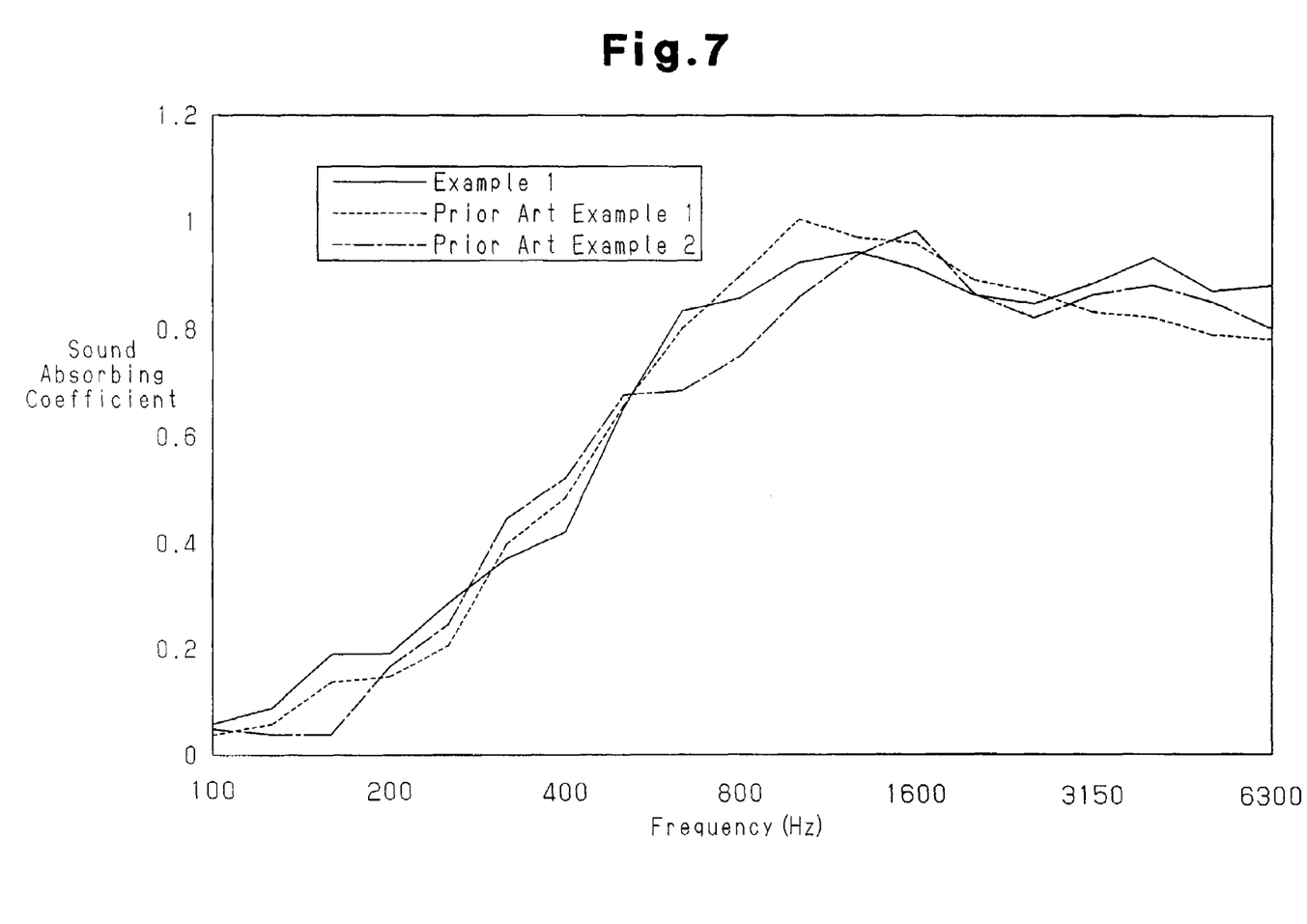
FIG. 7 is a graph showing a result of measurement of the sound absorbing coefficient with of soundproof materials in accordance with an example and a comparative example.

Further, FIG. 7 shows results of measurement of the sound absorbing coefficient with respect to the example 1, the prior art example 1 and the prior art example 2. In order to measure the sound absorbing coefficient, as shown in FIG. 3B, the soundproof material 11 was installed on the metal panel P in such a manner that the first sound absorbing layer 13 was directed toward the metal panel P. Further, the speaker S and the microphone M were installed toward the first sound absorbing layer 13. Sounds of various frequencies were outputted from the speaker S, and picked up by the microphone M after being reflected by the soundproof materials, and the value of the sound absorbing coefficient is determined on the basis of the measured results. In this case, the panel P corresponded to the floor panel of the vehicle, and serves as a reflector for reflecting the sound. In accordance with the results of measurement, approximately the same sound absorbing coefficient was obtained in the soundproof material of the example 1, and in the soundproof materials of the comparative examples 1 and 2.

In other words, it was confirmed that the sound absorbing coefficient of the soundproof material 11 of the example 1 had the same level as the prior art soundproof material, however, the transmission loss thereof was larger than the prior art soundproof material. Accordingly, if the soundproof material 11 of the example 1 is used, the quietness within the passenger compartment is improved.

Further, there was prepared soundproof materials 11 in accordance with comparative examples 1 to 4. In the comparative example 1, the mass per area of the first sound absorbing layer 13 was changed to 150 g/m$^2$, and in the comparative example 2, the mass per area of the first sound absorbing layer 13 was changed to 2250 g/m$^2$. Further, in the comparative example 3, the air permeability of the intermediate layer 15 was changed to 10 cc/cm$^2$/sec, and in the comparative example 4, the air permeability of the intermediate layer 15 was changed to 20 cc/cm$^2$/sec.

Figure 8:
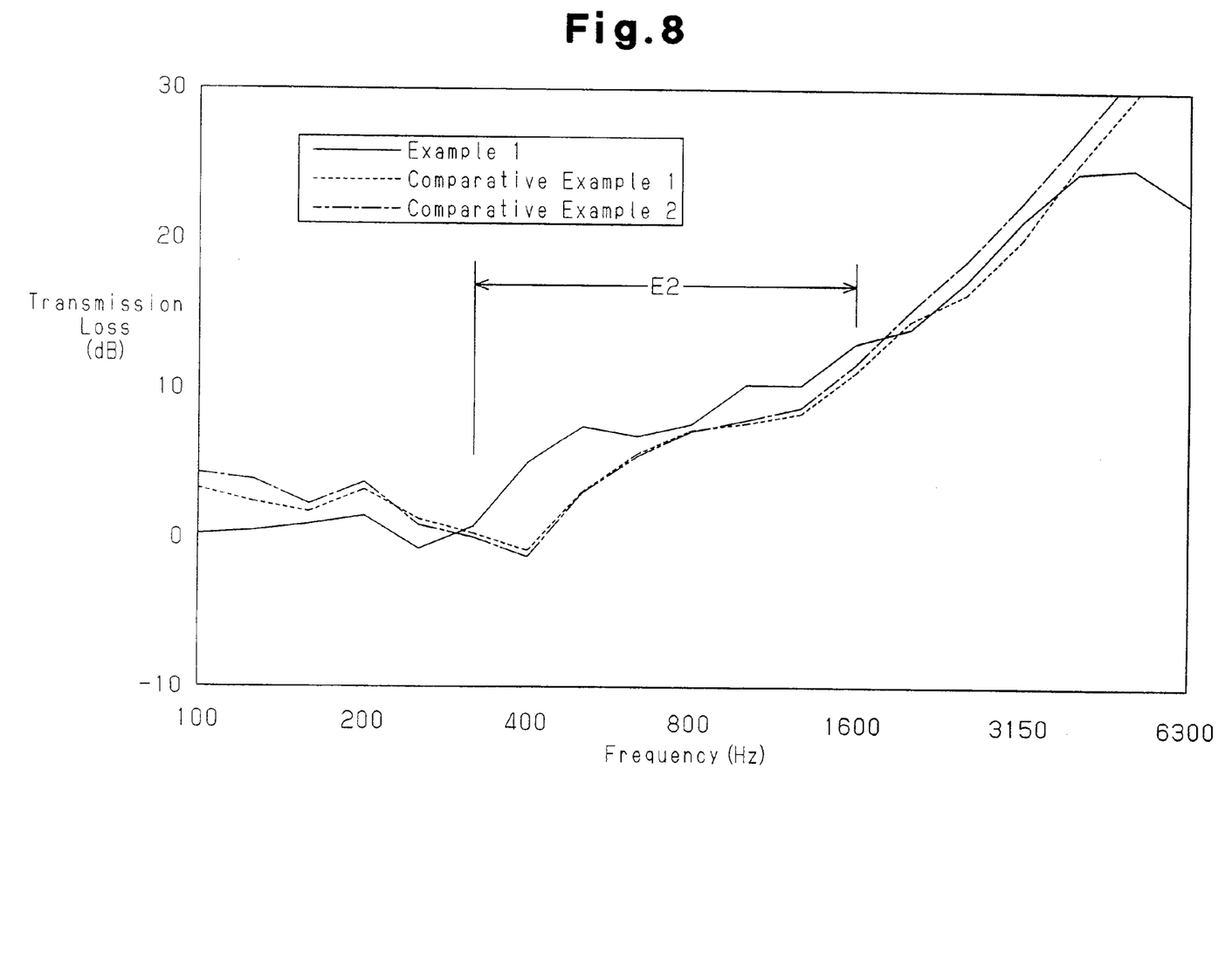
FIG. 8 is a graph showing a result of measurement of the transmission loss of soundproof materials in accordance with an example and a comparative example.

FIG. 8 shows results of measurement of the transmission loss with respect to the soundproof materials 11 in accordance with the comparative example 1 and the comparative example 2. On the basis of the results, it was confirmed that in the case of the soundproof material 11 of the example 1, the transmission loss was greater than the soundproof materials of the comparative example 1 and the comparative example 2 in the low frequency region near 350 to 2000 Hz, inclusive (a range E2 in FIG. 6). Accordingly, if the balance between the first sound absorbing layer 13 and the second sound absorbing layer 14 is properly set such as the example 1, the noise is reduced over the wide frequency region including the frequency region felt uncomfortable (near 500 Hz).

Figure 9:
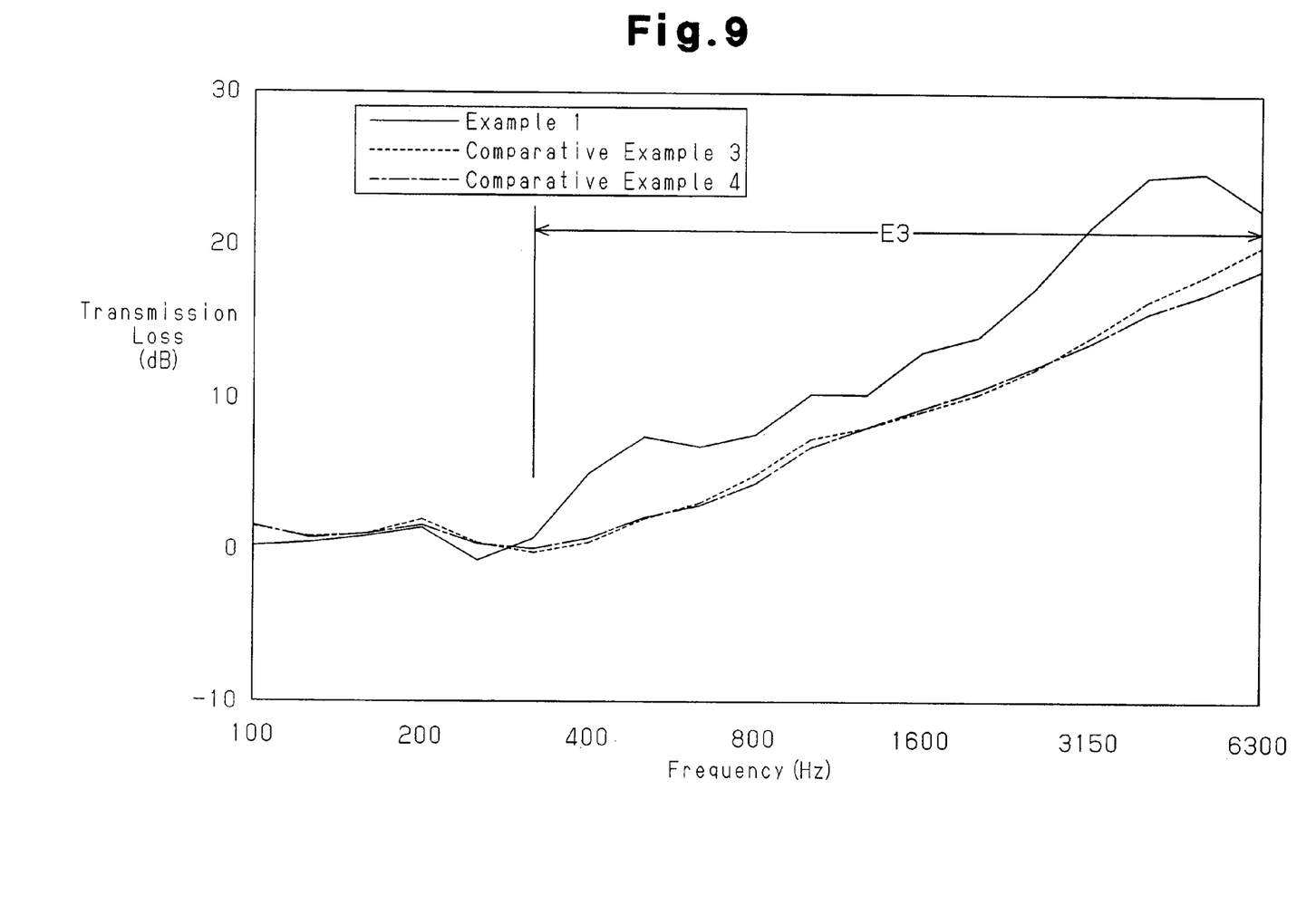
FIG. 9 is a graph showing a result of measurement of the transmission loss of soundproof materials in accordance with an example and the comparative example.

Further, FIG. 9 shows results of measurement of the transmission loss with respect to the soundproof materials in accordance with the comparative example 3 and the comparative example 4. On the basis of the results, it was confirmed that in the case of the soundproof material of the example 1, the transmission loss was greater than the soundproof materials of the comparative example 3 and the comparative example 4 in the extremely wide frequency region equal to or more than 350 Hz (a range E3 in FIG. 9). In other words, it was confirmed that it is possible to reduce the noise over the wide frequency range, if the air permeability is set equal to or less than 5 cc/cm$^2$/sec such as the example 1.

The present embodiment may be modified as follows.

Figure 4:
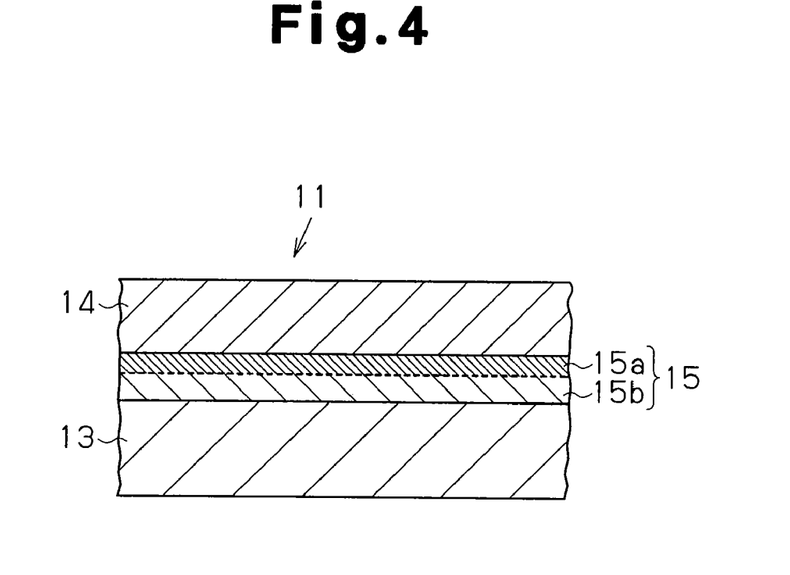
FIG. 4 is a partial cross-sectional view showing a soundproof material in accordance with a modified embodiment.

As shown in FIG. 4, the ornamental layer 16 may be omitted. In this case, the structure is preferably used for other intended uses than the automobile, for example, as a soundproof material for an architectural structure.

Figure 5:
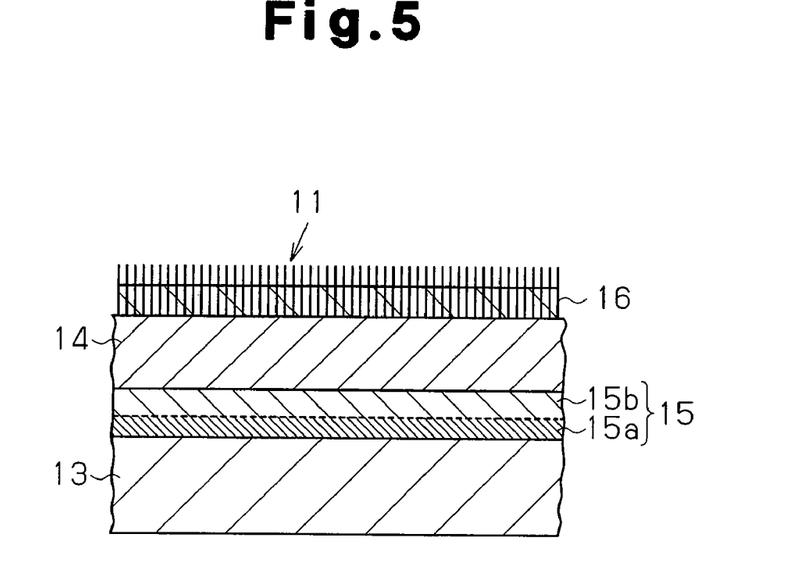
FIG. 5 is a partial cross-sectional view showing a soundproof material in accordance with another modified embodiment.

As shown in FIG. 5, the positions of the high-density layer 15a and the low-density layer 15b may be switched, in the intermediate layer 15. In other words, the high-density layer 15a may be arranged adjacent to the first sound absorbing layer 13, and the low-density layer 15b may be arranged adjacent to the second sound absorbing layer 14. In this case, it is possible to increase the transmission loss of the soundproof material 11.

The first and second sound absorbing layers 13 and 14 or the intermediate layer 15 may be formed by other materials than the foam resin or the like.

The front and back sides of the soundproof material 11 may be inverted in such a manner that the second sound absorbing layer 14 serves as the spring, and the first sound absorbing layer 13 serves as the mass.

The invention claimed is:

1. A motor vehicle having a soundproof material arranged on at least a portion of the floor within a compartment of the motor vehicle, the soundproof material comprising:

a first sound absorbing layer directed toward the floor surface and a second sound absorbing layer directed toward the motor vehicle compartment, wherein the first and second sound absorbing layers have an air permeability; the density of the first sound absorbing layer is lower than that of the second absorbing layer;

an intermediate layer provided between said first and second sound absorbing layers, wherein said intermediate layer has a two-layer structure of a high-density layer and a low-density layer, wherein an air permeability of said intermediate layer is lower than the air permeability of said first and second sound absorbing layers, and wherein said intermediate layer is arranged in such a manner that said high-density layer is adjacent to said second sound absorbing layer, wherein the air permeability of each of said first and second sound absorbing layers of the soundproof material is between 5 and 100 cc/cm$^2$/sec, inclusive, and wherein the air permeability of said intermediate layer of the soundproof material is greater than or equal to 2 cc/cm$^2$/sec and less than 5 cc/cm$^2$/sec.

2. The motor vehicle according to claim 1, wherein said first and second sound absorbing layers of the soundproof material are constituted by a porous material, a mass per area of said first sound absorbing layer is between 300 and 1800 g/m$^2$, inclusive, and a mass per area of said second sound absorbing layer is between 500 and 1000 g/m$^2$, inclusive.

3. The motor vehicle according to claim 1, wherein a thickness of said first sound absorbing layer is between 10 and 60 mm, inclusive, and a thickness of said second sound absorbing layer is between 4 and 15 mm, inclusive.

4. The motor vehicle according to claim 1, wherein a mass per area of said intermediate layer of the soundproof material is between 100 and 500 g/m$^2$, inclusive.

5. The motor vehicle according to claim 1, wherein a thickness of said intermediate layer of the soundproof material is between 0.1 and 4 mm, inclusive.

6. The motor vehicle according to claim 1, wherein said intermediate layer of the soundproof material is constituted by a synthetic resin, and said high-density layer is formed by heating one surface of said intermediate layer.

7. The motor vehicle according to claim 1, wherein the soundproof material further comprises an ornamental layer formed on said second sound absorbing layer, wherein an air permeability of said ornamental layer is equal to or more than 30 cc/cm$^2$/sec.

* * * * *